United States Patent
Rutz et al.

(10) Patent No.: US 6,595,603 B2
(45) Date of Patent: Jul. 22, 2003

(54) DRIVE SPROCKET WHEEL FOR A TRACK VEHICLE

(75) Inventors: Werner Rutz, Queidersbach (DE); Ingo Nöske, Zweibrücken (DE)

(73) Assignee: Demag Mobile Cranes GmbH & Co. KG, Munich (DE)

( * ) Notice: Subject to any disclaimer, the term of this patent is extended or adjusted under 35 U.S.C. 154(b) by 90 days.

(21) Appl. No.: 09/847,360

(22) Filed: May 2, 2001

(65) Prior Publication Data

US 2001/0045773 A1 Nov. 29, 2001

(30) Foreign Application Priority Data

May 3, 2000 (DE) .......................................... 100 22 080

(51) Int. Cl.⁷ .......................... B62D 53/12; F16H 55/30; F16G 1/28; F16G 13/02
(52) U.S. Cl. ....................... 305/199; 305/193; 474/235; 474/152; 474/202
(58) Field of Search ................................. 305/193, 194, 305/195, 196, 199 I; 474/206, 232, 235, 152, 162, 202

(56) References Cited

U.S. PATENT DOCUMENTS

| | | | | |
|---|---|---|---|---|
| 616,936 A | * | 1/1899 | Kidd ............................ | 474/155 |
| D35,390 S | * | 12/1901 | Dodge ......................... | 474/152 |
| 1,678,149 A | * | 7/1928 | Lamb .......................... | 305/101 |
| 2,385,923 A | * | 10/1945 | Klaucke et al. .............. | 305/196 |
| 2,727,794 A | | 12/1955 | Davidson et al. | |
| 5,453,059 A | * | 9/1995 | Avramidis et al. .......... | 474/212 |
| 5,632,538 A | * | 5/1997 | Wiesner et al. ............. | 305/194 |
| 5,636,911 A | * | 6/1997 | Korpi .......................... | 305/193 |
| 5,976,045 A | * | 11/1999 | Young ......................... | 474/152 |

FOREIGN PATENT DOCUMENTS

| | | |
|---|---|---|
| DE | 43 31 482 | 3/1994 |
| GB | 1 602 143 | 11/1991 |

* cited by examiner

Primary Examiner—S. Joseph Morano
Assistant Examiner—Jason R. Bellinger
(74) Attorney, Agent, or Firm—Cohen, Pontani, Lieberman & Pavane

(57) ABSTRACT

An undercarriage for a track vehicle includes an endless track having links of constant length connected end to end in the direction of travel, each link having a pair of spaced-apart guide webs and a cog which connects the webs, the cogs being of substantially identical size. The drive sprocket wheel has at least two circumferential sections with teeth having spaces therebetween for engaging cogs. The tooth pitch in each section decreases in the direction of travel from a maximum valve to a minimum value, the space between teeth having the minimum value being sufficient to accommodate one of the cogs with clearance.

9 Claims, 4 Drawing Sheets

DRIVE SPROCKET WHEEL FOR A TRACK VEHICLE

BACKGROUND OF THE INVENTION

1. Field of the Invention

The invention pertains to a drive sprocket wheel for a track-type undercarriage, especially for lattice mast cranes, which sprocket wheel has track teeth around its circumference and works together with an endless track. The endless track has individual track links, each with its own base plate, where each track link has two spaced-apart guide webs which are symmetric to the center of the link; a cog extending downward between the links meshes with the track teeth of the sprocket wheel.

2. Description of the Related Art

A sprocket wheel of the general type in question is known from GB 1,602,143. This works together with an endless track and is provided with track teeth of the involute type. The endless track consists of multiple track links, each with its own base plate and with two guide webs asymmetric to the center at a certain distance apart, and having engaging surfaces which ride on circumferential flanges on the sprocket wheel. A cog connects the two webs from a position below the engaging surfaces and meshes with the teeth of the sprocket wheel. The transverse pitch or pitch angle, which is obtained by dividing 360 degrees by the number of track teeth, is constant over the entire circumference. The disadvantage of the known solution is that, when a crane is traveling downhill, it must be braked. As a result of the clearance present in all segments, a relative displacement occurs between the sprocket wheel and the endless track, so that the head area of the track tooth runs up against the flank of the cog. In the least favorable case, the track tooth shears off the flank of the cog, which leads to a further deterioration in the meshing conditions, as can be recognized from the loud noise produced. The problems just described also occur when the change is made from forward to reverse travel.

A camshaft drive for passenger car engines in the form of a sprocket wheel chain drive is known from DE 43 31 482, which, to suppress howling noises caused by resonance vibrations, provides sprocket wheels with varying pitch and a chain with links of different lengths corresponding to the varying pitch of the sprocket wheels. The problems of improving the meshing between the sprocket wheel and the chain is not addressed in this document.

SUMMARY OF THE INVENTION

The task of the invention is to improve the sprocket wheel of the general type in question in such a way that the disadvantages described above are avoided.

According to the invention, the toothed rim area of the sprocket wheel has at least two circumferential sections, which, while the tooth width remains constant, are provided with a transverse pitch which varies from segment to segment, one "segment" being defined as the intermediate space between the centers of two immediately adjacent teeth. The rule applies here that the sum of all deviating transverse pitches divided by the number of teeth results in a value which corresponds to the constant transverse pitch. Another characteristic is that, relative to the rotational direction of the sprocket wheel, the transverse pitch decreases from a maximum value to a minimum value or increases from a minimum value to a maximum value in each circumferential section, and also that the greatest difference in the transverse pitch occurs at the transition from one circumferential section to the next. The smallest occurring minimum value of the transverse pitch is selected so that, relative to the cog of the endless track engaging in the spacewidth, a clearance remains, which, under consideration of the production tolerances for the endless track and the sprocket wheel and the wear of the endless track, makes it possible for the cog to engage in the spacewidth. With respect to production tolerances, the least favorable pairing (i.e., cog at the upper tolerance limit and spacewidth at the lowest tolerance limit) is to be taken into account, and, with respect to wear, essentially the stretching of the endless track is to be considered. The endless track used with the sprocket wheel according to the invention has links of uniform length, as is conventional.

The proposed design offers the advantage that the previously known difficulties not longer occur, especially those associated with traveling downhill, because the endless track is held by the segment of the sprocket wheel with the narrowest pitch, and thus it is impossible for relative motion to occur between the sprocket wheel and the endless track.

The toothed rim area preferably has at least two similar (rotationally symmetric to the rotational axis of the sprocket wheel) circumferential sections, which, whereas the tooth width remains constant, are provided with a transverse pitch which changes from segment to segment, where the sum of all deviating transverse pitches in the circumferential section in question divided by the number of track teeth of this section results in a value which corresponds to the constant transverse pitch.

In cases where the transverse pitch decreases in the rotational direction of the sprocket wheel, the total clearance between the cog and the spacewidth decreases from a maximum value to a minimum value in the segment formed by a trailing and a leading tooth. The reverse is true in the case of an increasing transverse pitch.

The total clearance preferably consists of a clearance component A formed between the leading flank of the trailing tooth and the trailing flank of the cog and a clearance component B formed between the trailing flank of the leading tooth and the leading flank of the cog, where the sum of clearance component A and clearance component B is different in each segment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
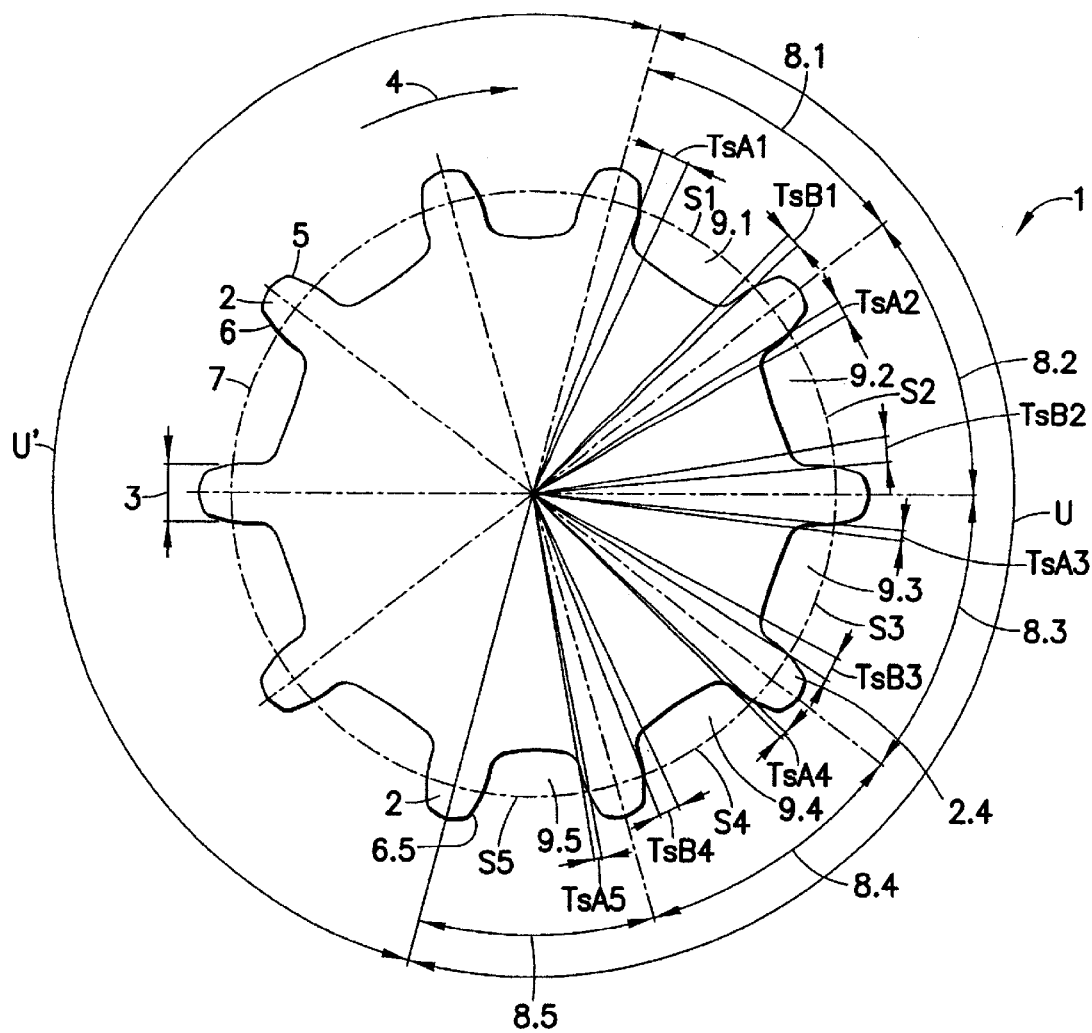
FIG. 1 shows a schematic diagram of a sprocket wheel designed in accordance with the invention.

In the exemplary embodiment of FIG. 1, the sprocket wheel 1 is provided with ten similarly designed track teeth 2, all of which have the same cross-sectional form and the same tooth width 3. Because direction in which the sprocket wheel 1 rotates is important for an understanding of the following description, this direction is indicated by an arrow of rotation 4. In this exemplary embodiment, the leading flank 5 and also the associated trailing flank 6 of each tooth 2 have the form of an involute, although the exact shape of the tooth is not important for the invention explained below. The transverse pitch is obtained by dividing the circumference of the pitch circle by the number of teeth 2. In the known sprocket wheels, the transverse pitch would be a constant 36° for ten teeth, when we express the circumference of the pitch circle in angular measure, i.e., 360°. The sprocket wheel shown in FIG. 1 preferably has two similar circumferential sections U and U', each extending over a circumferential distance of 180°. The following explanation pertains to the circumferential section U, seen here on the right. According to the invention, the transverse pitch is not constant in this circumferential section U. Instead, looking in the direction of rotation 4 of the sprocket wheel 1, it decreases from a maximum value at 8.1 to a minimum value at 8.5. The sum of all transverse pitches 8.1–8.5 of all segments S1–S5 in this circumferential section U is 180°. When we divide 180° by the number of teeth, which is five in the present case, we obtain the previously mentioned constant transverse pitch of 36°.

Another approach is to provide the difference value by which the constant value of 36° is exceeded with a "plus" sign and the amount by which the pitch falls below the constant value with a "minus" sign. The following conditions then result: $S1=+\alpha°$; $S2=+\beta°$; $S3=+\gamma°$; $S4=+\delta°$; $S5=\epsilon°$, where $\delta>\gamma>\beta>\alpha$. The sum of the too-high values (+) of segments 1–4 is $a=(\alpha+\beta+\gamma+\delta)$, and the sum of all the too-low values (−) of segment 5 is $-a=(\epsilon)$. Thus the values which are too high and those which are too low cancel each other out. To illustrate how this varying transverse pitch affects the interaction with the cog 9 of the endless track, a shaded field indicates the meshing of the cog 9 with the associated spacewidth. The spacewidth $Z_i$ in question is obtained by finding the difference between the leading flank $5_i$ of the trailing tooth $2_i$ and the trailing flank $6_{i+1}$ of the leading tooth $2_{i+1}$.

Figure 2:
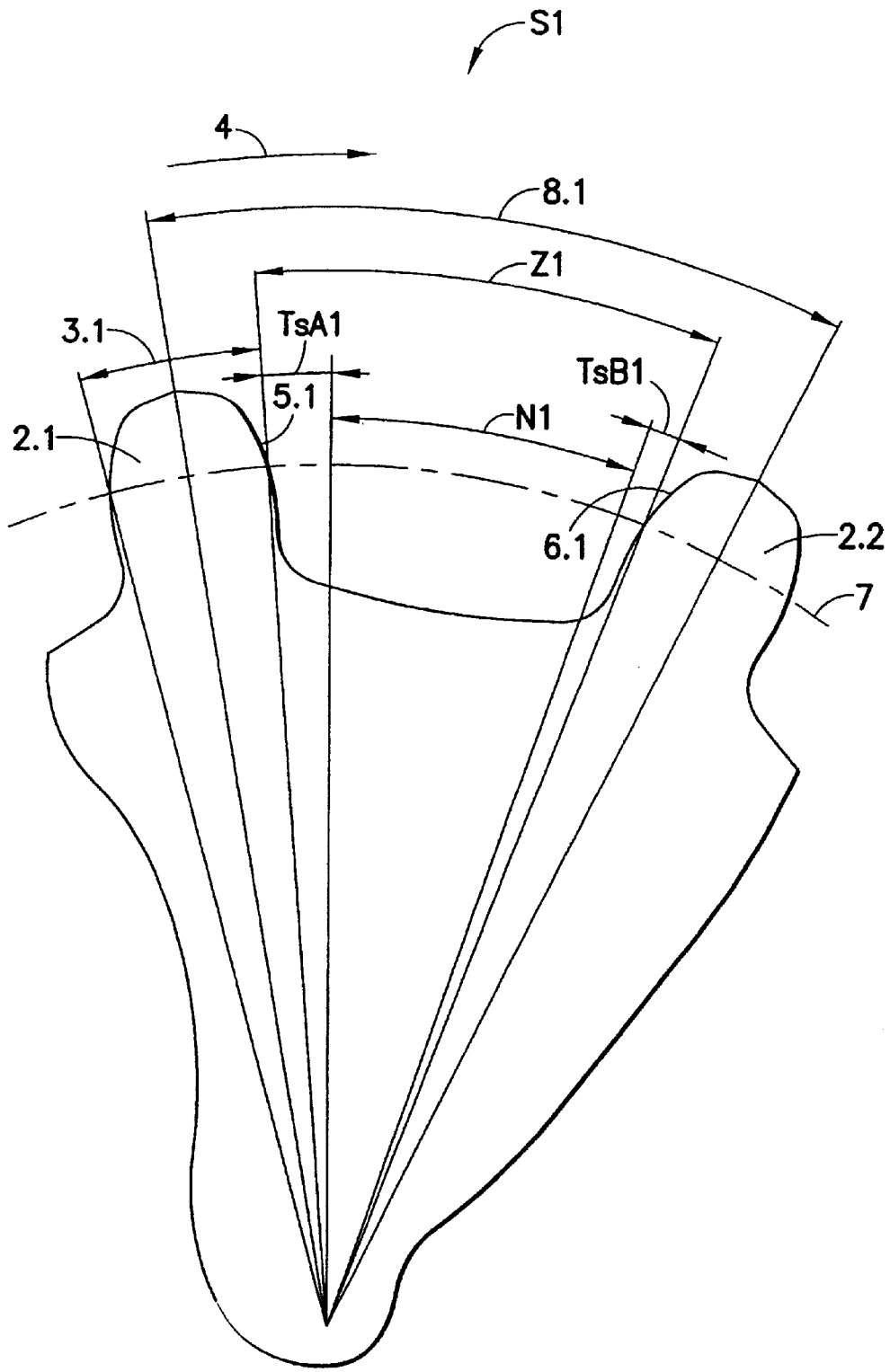
FIG. 2 shows an enlarged view of a segment of the toothed rim area.
Figure 3:
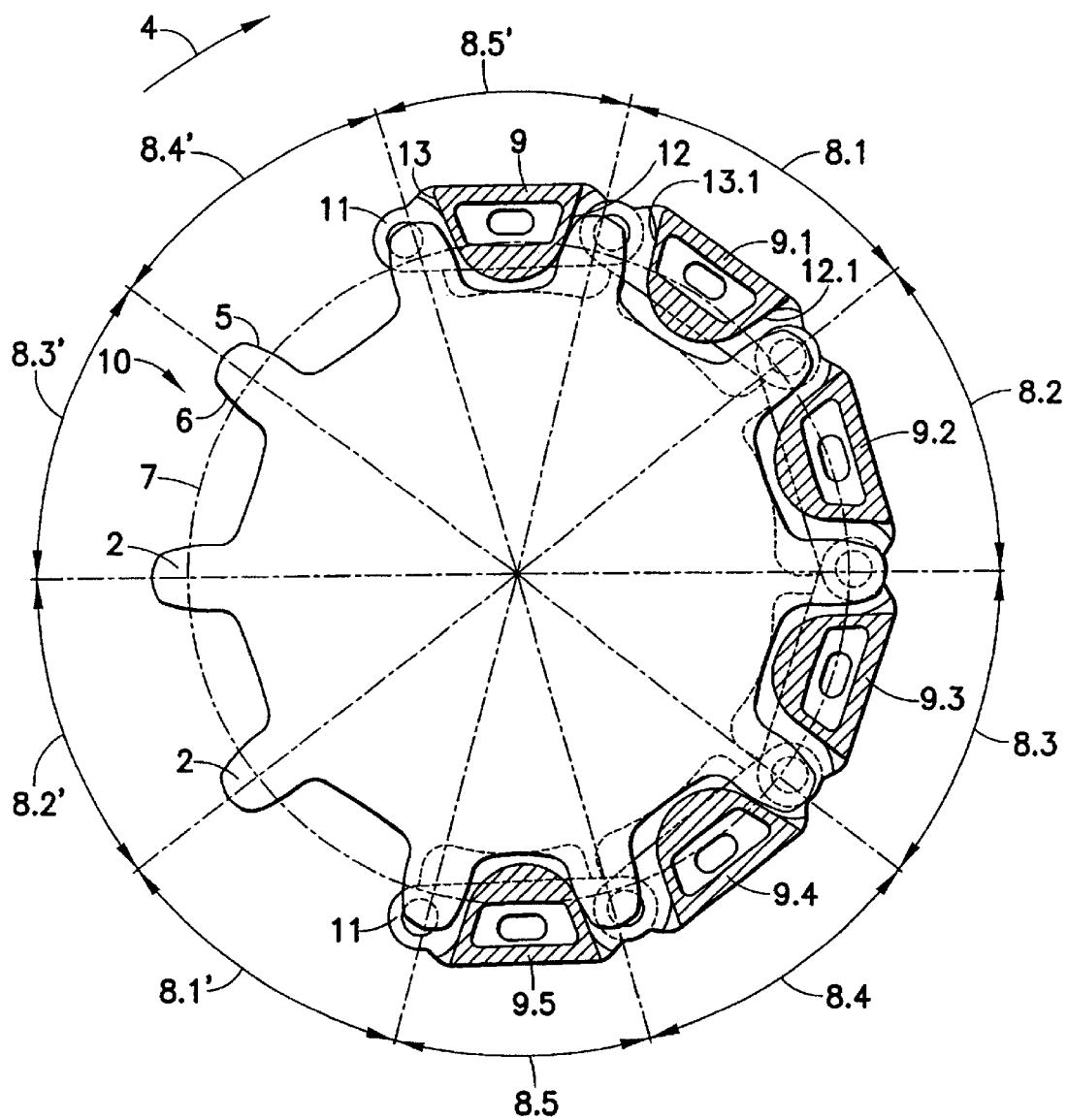
FIG. 3 shows a front view of an exemplary embodiment of a sprocket wheel cooperating with an endless track.

FIG. 2 shows on an enlarged scale the relationships for the first segment S1. The radian measure of the spacewidth Z1 of the first segment S1, relative in all cases to the pitch circle 7, is equal to the transverse pitch 8.1 minus the tooth width 3.1, expressed in radians. This circumferential distance Z1 must be put in relationship to the dimension N1 of the cog 9.1 (FIG. 3). The difference between the spacewidth Z1 and the dimension N1 of the cog 9.1 is the total clearance GS in this first segment S1. It is easy to see that the total clearance GS is divided into a clearance component $T_sA1$, formed between the leading flank 5.1 of the first tooth 2.1 and the trailing flank 13.1 (FIG. 3) of the cog 9.1 and a clearance component $T_sB1$ formed between the trailing flank 6.1 of the leading tooth 2.2 and the leading flank 12.1 (FIG. 3) of the cog 9.1.

As shown in FIG. 1, this relationship between $T_sA_i$ and $T_sB_i$ changes from segment to segment. In the last segment 55, the clearance component $T_sB5=0$; that is, the cog 9.5 is in full contact with the trailing flank 6.5. The other clearance component $T_sA5$, however, has fallen to the minimum value. In the following circumferential section U', the relationships are rotationally symmetric; that is, they begin again with a maximum value of the transverse pitch and end with a minimum value of the transverse pitch.

FIG. 3 shows a sprocket wheel 10 similar to that of FIG. 1, but this time it is working together with an endless track 11. The rotational direction 4 is the same as that of FIG. 1. The pitch circle relationships, however, are somewhat different, because, first, the minimum clearance has been increased and the radian measure of the cogs has been reduced. Thus the clearance components $T_sA_i$ and $T_sB_i$ are increased accordingly.

Figure 4:
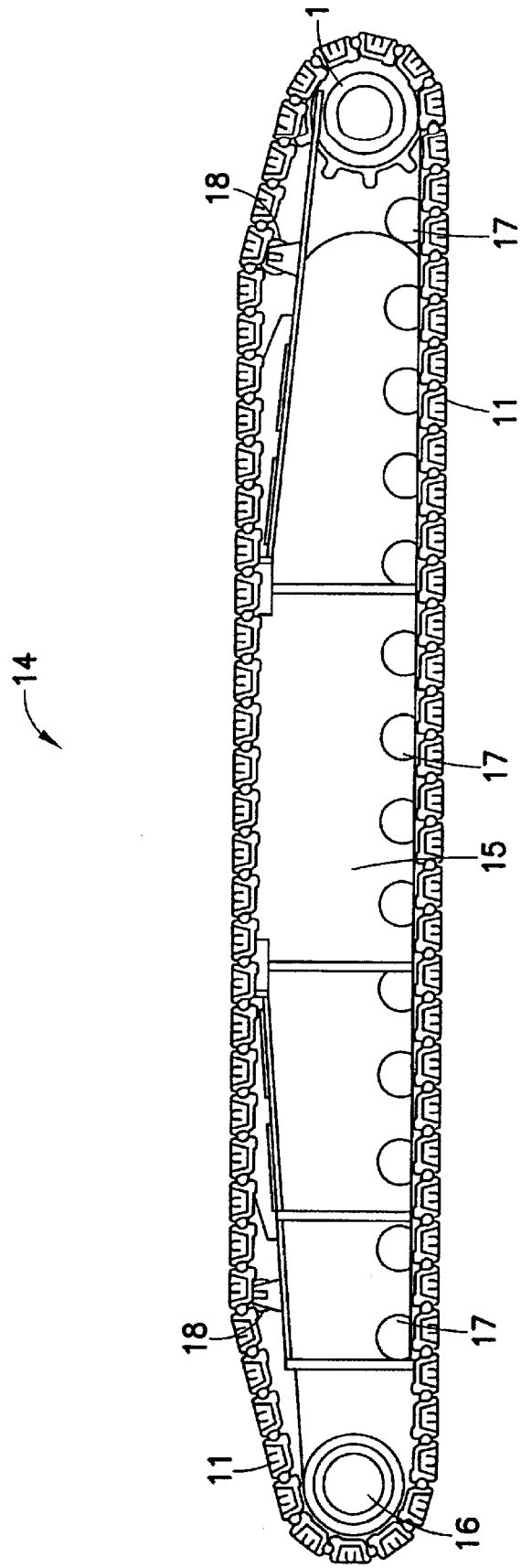
FIG. 4 is a side view of an undercarriage for a track vehicle having a drive sprocket and endless track according to the invention

FIG. 4 shows a track-type undercarriage 14 according to the invention, which has a track carrier 15 with an engine-driven sprocket wheel (1) at its right end and an idler 16 at its left end. In the lower part of the track carrier 15 are numerous track rollers 17, and in the upper part of the crawler carrier 15 are two deflecting rollers 18. An endless track 11 formed out of numerous track links of constant length is guided around the sprocket wheel 1, the track rollers 17, the idler 16, and the deflecting rollers 18. The sprocket wheel 1 has a set of teeth for the endless track 11, which will be explained in greater detail on the basis of FIGS. 1–3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A track-type undercarriage for a vehicle, said undercarriage comprising
   a track carrier,
   an endless track guided on said track carrier and having a direction of travel, said endless track comprising a plurality of links connected end-to-end in said direction of travel, each link comprising a pair of spaced-apart guide webs and a cog which connects said webs, said cogs all being of substantially identical size, and
   a drive sprocket arranged on said carrier for driving said endless track, said drive sprocket having at least two circumferential sections and a plurality of teeth arranged over each of said sections, said teeth having spaces therebetween for engaging said cogs of said endless track, said teeth having a constant tooth width and being separated by a transverse pitch which decreases from a maximum value to a minimum value over each said circumferential section, the space between the teeth having said minimum pitch value being of sufficient size to accommodate one of said cogs with clearance.

2. A track-type undercarriage as in claim 1 wherein the sum of the transverse pitches in each said section divided by the number of teeth in each said section results in a constant pitch which is equal to 360 degrees divided by the total number of teeth for all of said sections.

3. A track-type undercarriage as in claim 2 wherein each transverse pitch in each said section differs from the constant pitch by a difference value, the sum of the difference values which exceed the constant pitch being equal to the sum of the difference values which fall below the constant pitch for each said circumferential section.

4. A track-type undercarriage as in claim 1 wherein said transverse pitch decreases in the direction of rotation of each said section, each said space accommodating a respective said cog with a clearance which decreases over each said circumferential section in said direction of rotation.

5. A track-type undercarriage as in claim 4 wherein the clearances from space to space over each said section decrease by absolute values which become continuously smaller.

6. A track-type undercarriage as in claim 5 wherein each said space is flanked by the trailing edge of a leading tooth and the leading edge of a trailing tooth, each said cog having a leading flank and a trailing flank, said clearance having a first component between the leading flank of the trailing tooth and the trailing flank of the cog, and a second component between the trailing flank of the leading tooth and the leading flank of the cog.

7. A track-type undercarriage as in claim 6 wherein the sum of said clearance components is different for each said space in each said section.

8. A track-type undercarriage as in claim 7 wherein said first clearance component is larger than said second clearance component for each said space, said first clearance component decreasing and said second clearance component increasing from space to space over each said section.

9. A track-type undercarriage as in claim 1 wherein said drive sprocket comprises two said circumferential sections wherein each said space is diametrically opposed from a space of identical transverse pitch.

* * * * *